CHARLES W. COE, OF FENTONVILLE, MICHIGAN.

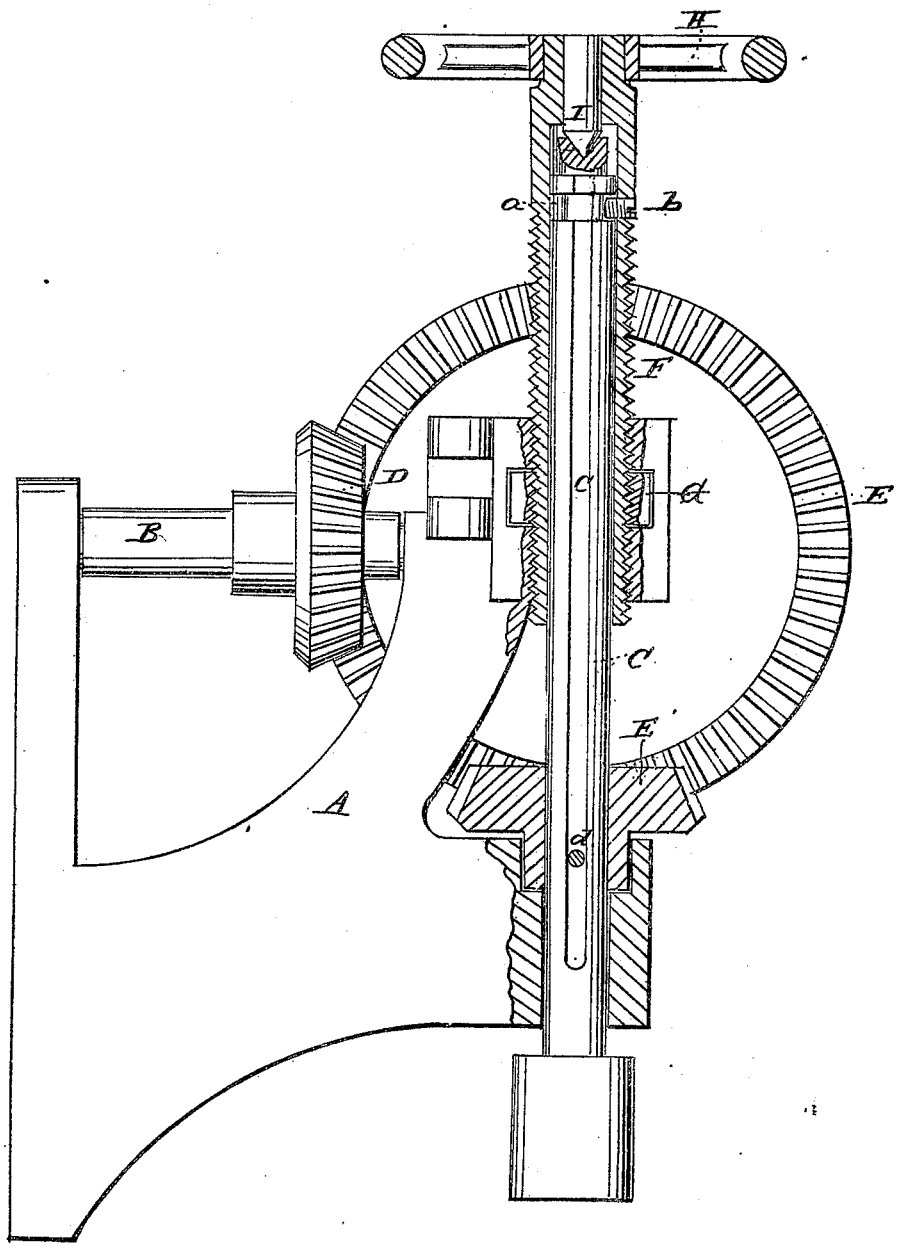

Letters Patent No. 86,001, dated January 19, 1869.

IMPROVED DRILLING AND BOLT-TAPPING MACHINE.

The Schedule referred to in these Letters Patent and making part of the same.

*To all whom it may concern:*

Be it known that I, CHARLES W. COE, of Fentonville, in the county of Genesee, and State of Michigan, have invented a new and useful Improvement in Drill and Bolt-Tapping Machines; and I do hereby declare that the following is a full, clear, and exact description thereof, which will enable others skilled in the art, to make and use the same, reference being had to the accompanying drawing, forming a part of this specification.

This invention relates to a new and useful improvement on a machine for drilling, cutting screws on bolts, &c., for which Letters Patent were granted to me, bearing date January 20, 1863, and numbered 37,433, and reissued February 19, 1867, and numbered 2,487.

The present improvement consists in a new and improved means for feeding the drill or screw-cutter to its work, as hereinafter fully shown and described, whereby much friction is avoided, and a much more desirable implement for the purpose specified obtained.

The accompanying drawing represents a sectional elevation of my invention.

A represents the frame of the implement, which may be of cast-iron or other suitable material, and which supports a horizontal shaft, B, from which the drill-arbor C is driven by bevel-gears D E E'. These parts, being common to drilling-machines, do not require a special description.

The upper part of the arbor C is fitted within a tubular screw, F, which works within a nut, G, fitted in the frame A.

The upper end of the screw F has a hand-wheel, H, attached, and within said screw, at its upper end, there is fitted a hardened-steel centre-point, I, which bears or rests in a hardened centre in the upper end of the arbor C.

The arbor C has a groove, a, made circumferentially in its exterior, near its upper end, and a screw, b, which passes laterally through the tubular screw F, passes within groove a, and holds the arbor C in position, or prevents it from dropping out of the tubular screw.

The gear E' is fitted loosely on the arbor C, so that the latter may move freely up and down within it, and the arbor has a groove, c, extending nearly the whole length of its exterior, a pin, d, passing through the hub of the gear into said groove, to form a connection between the gear and the arbor, which causes the latter to turn with the former, without obstructing the free up-and-down movement of the arbor.

By this arrangement, it will be seen that the arbor C is fed down by turning the hand-wheel H, and consequently the tubular screw F, the hardened centre-point I bearing down upon the top of the arbor C, and feeding the drill or screw-cutter, on the lower end of arbor C, to its work.

By this simple means, much friction is avoided, and consequent wear and tear.

I am aware that the tubular screw, band-wheel, nut, arbor, and gearing are not new, and that the combination of these several parts is found described in the patent granted to E. S. Young and Amos Whipple, September 10, 1867, and I do not claim said devices, nor their combination; but What I do claim, is—

The combination of the centre-point I with said devices, arranged substantially as described.

CHARLES W. COE.

Witnesses:
ALEX. F. ROBERTS,
JAMES T. GRAHAM.